(12) United States Patent
Adinarayan et al.

(10) Patent No.: US 10,078,578 B2
(45) Date of Patent: *Sep. 18, 2018

(54) ANALYTICALLY SELECTING WHICH TESTS ARE TO BE EXECUTED IN A CONTINUOUS DELIVERY PROCESS

(71) Applicant: International Business Machines Corporation, Armonk, NY (US)

(72) Inventors: Geetha Adinarayan, Bangalore (IN); Shaw-Ben S. Shi, Austin, TX (US); Gandhi Sivakumar, Victoria (AU); Meng H. Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,265

(22) Filed: May 16, 2016

(65) Prior Publication Data
US 2017/0329699 A1 Nov. 16, 2017

(51) Int. Cl.
*G06F 9/44* (2018.01)
*G06F 11/36* (2006.01)

(52) U.S. Cl.
CPC .................. *G06F 11/3672* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | | |
|---|---|---|---|---|
| 8,266,592 | B2 | 9/2012 | Beto et al. | |
| 2009/0265681 | A1* | 10/2009 | Beto | G06F 11/3672 717/100 |
| 2011/0197176 | A1* | 8/2011 | Muharsky | G06F 11/3672 717/113 |
| 2012/0278135 | A1* | 11/2012 | Haber | G06Q 10/00 705/7.38 |

(Continued)

OTHER PUBLICATIONS

Anderson et al., Improving the Effectiveness of Test Suite through Mining Historical Data, 2014.*

(Continued)

*Primary Examiner* — Andy Ho
*Assistant Examiner* — Zhan Chen
(74) *Attorney, Agent, or Firm* — Robert A. Voigt, Jr.; Winstead, P.C.

(57) ABSTRACT

A method, system and computer program product for analytically selecting which tests are to be executed in a continuous delivery process. An analytics processing system constructs a code dependency tree to analyze the tests that are affected by changes in code after a new build is generated. After analyzing the code dependency tree, the system eliminates those tests in the code dependency tree that do not depend on the changed code. The system then analyzes the historical execution records for those tests that have not been eliminated for execution to obtain an execution rate and a failure rate for those tests. A score is generated for each of the tests from the code dependency tree that were not eliminated for execution based on the historical execution rate and failure rate of the test. Tests that have a score that exceeds a threshold are included for execution.

14 Claims, 3 Drawing Sheets

(56) References Cited

U.S. PATENT DOCUMENTS

| | | | |
|---|---|---|---|
| 2014/0304556 A1* | 10/2014 | Alexander | G06F 11/2635 714/45 |
| 2015/0007140 A1 | 1/2015 | Boshernitsan et al. | |
| 2015/0154094 A1* | 6/2015 | Pasala | G06F 11/263 714/37 |
| 2016/0162392 A1* | 6/2016 | Hu | G06F 11/3684 714/38.1 |
| 2016/0321586 A1* | 11/2016 | Herzig | G06Q 10/06313 |
| 2017/0235661 A1* | 8/2017 | Liu | G06F 11/368 717/106 |

OTHER PUBLICATIONS

Marijan et al., Test Case Prioritization for Continuous Regression Testing an Industrial Case Study, 2013.*

Zhang et al., Assertions are strongly correlated with test suite effectiveness, 2015 (Year: 2015).*

Kapfhammer et al., Using coverage effectiveness to evaluate test suite prioritizations, 2007 (Year: 2007).*

Marchetto et al., A multi-objective technique to prioritize test cases, 2015 (Year: 2015).*

Inozenntseva et al., Coverage is not strongly correlated with test suite effectiveness, 2014 (Year: 2014).*

Gupta et al., "Testing at the Speed and Scale of Google," http://google-engtools.blogspot.com/2011/06/testing-at-speed-and-scale-of-google.html, Jun. 8, 2011, pp. 1-11.

Microsoft, "Which Tests Should be Run Since a Previous Build," https://msdn.microsoft.com/en-us/library/dd286589.aspx?f=255&MSPPError=-2147217396, 2015, pp. 1-2.

Stack Overflow, "Determine if Code is Running as Part of a Unit Test," http://stackoverflow.com/questions/3167617/determine-if-code-is-running-as-part-of-a-unit-test, 2015, pp. 1-5.

Martin Fowler, "Continuous Integration," http://www.martinfowler.com/articles/continuousIntegration.html#KeepTheBuildFast, May 1, 2006, pp. 1-13.

Bharati et al., "Analysis of Different Regression Testing Approaches," International Journal of Advanced Research in Computer and Communication Engineering, vol. 2, Issue 5, May 2013, pp. 2150-2155.

Anonymously, "Mechanism and Algorithm for Optimizing Test Case Execution Using Historical Data," IP.com, IPCOM000198310D, Aug. 10, 2010, pp. 1-5.

List of IBM Patents or Patent Applications Treated as Related, Aug. 29, 2017, pp. 1-2.

Office Action for U.S. Appl. No. 15/689,468 dated Apr. 27, 2018, pp. 1-37.

Kim et al., "A History-Based Test Prioritization Technique for Regression Testing in Resource Constrained Environments," ICSE'02, Orlando, Florida, U.S.A., May 19-25, 2002, pp. 119-129.

* cited by examiner

ANALYTICALLY SELECTING WHICH TESTS ARE TO BE EXECUTED IN A CONTINUOUS DELIVERY PROCESS

TECHNICAL FIELD

The present invention relates generally to continuous delivery, and more particularly to analytically selecting which tests are to be executed in a continuous delivery process.

BACKGROUND

Continuous delivery is a software engineering approach in which teams produce software in short cycles, ensuring that the software can be reliably released at any time. It aims at building, testing and releasing software faster and more frequently. This approach helps reduce the cost, time and risk of delivering changes by allowing for more incremental updates to applications in production.

Typically, the time required in a continuous delivery process is dominated by the quality assurance phase. The higher the quality of the software product to be deployed, the more time in building and testing the software product is typically required. That is, if a higher quality software product is desired to be deployed, then one many need to run more tests in the process thereby lengthening the total time in delivering the software product. If, on the other hand, a shorter deployment time is required, then one may need to reduce the number of tests of the software product.

Due to the pressure in delivering the software product as quickly as possible to the market, there is a tendency to have a shorter cycle time at the expense of the number of tests of the software product. As a result, it is not always feasible to carry out the full set of tests on the software product. However, there is not currently a means for determining the smallest number of tests to run on the software product that is needed to achieve the required quality in the fast continuous delivery process.

SUMMARY

In one embodiment of the present invention, a method for analytically selecting which tests are to be executed in a continuous delivery process comprises constructing a code dependency tree to analyze tests affected by changes in code after a new build is generated, where the code dependency tree illustrates which code is utilized by a particular test. The method further comprises analyzing, by a processor, the code dependency tree to determine which tests need to be executed based on whether those tests depend on a changed code. The method additionally comprises eliminating those tests in the code dependency tree for execution that do not depend on the changed code. Furthermore, the method comprises analyzing, by the processor, historical execution records for those remaining tests from the code dependency tree that were not eliminated to obtain an execution rate and a failure rate for each of the remaining tests, where the execution rate indicates how often a test is being executed and the failure rate indicates how often a test has failed. Additionally, the method comprises generating a score for each of the remaining tests from the code dependency tree that were not eliminated based on the execution rate and the failure rate. In addition, the method comprises executing those tests of the remaining tests from the code dependency tree that were not eliminated whose score exceeds a threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for analytically selecting which tests are to be executed in a continuous delivery process. In one embodiment of the present invention, an analytics processing system constructs a code dependency tree to analyze the tests that are affected by changes in code after a new build is generated, where the code dependency tree refers to a hierarchical tree that illustrates which code is utilized by a particular test. The system analyzes the code dependency tree to determine which tests need to be executed based on whether those tests depend on the changed code. After analyzing the code dependency tree, the system eliminates those tests in the code dependency tree that do not depend on the changed code for execution. The system then analyzes the historical execution records for those tests in the code dependency tree that have not been eliminated for execution ("remaining tests" for execution) to obtain an execution rate and a failure rate for each test that has not been eliminated for execution. An "execution rate," as used herein, refers to how often a test is being executed over a duration of time. A "failure rate," as used herein, refers to how often a test fails. A score (referred to herein as the "test score") is generated for each of the remaining tests from the code dependency tree that were not eliminated for execution based on the historical execution rate of the test and the historical failure rate of the test. Tests that have a test score that exceeds a threshold are included for execution, whereas, those tests with a test score that does not exceed the threshold are excluded from execution. In this manner, the smallest number of tests is selected to test the software product that is needed to achieve the required quality in the continuous delivery process.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
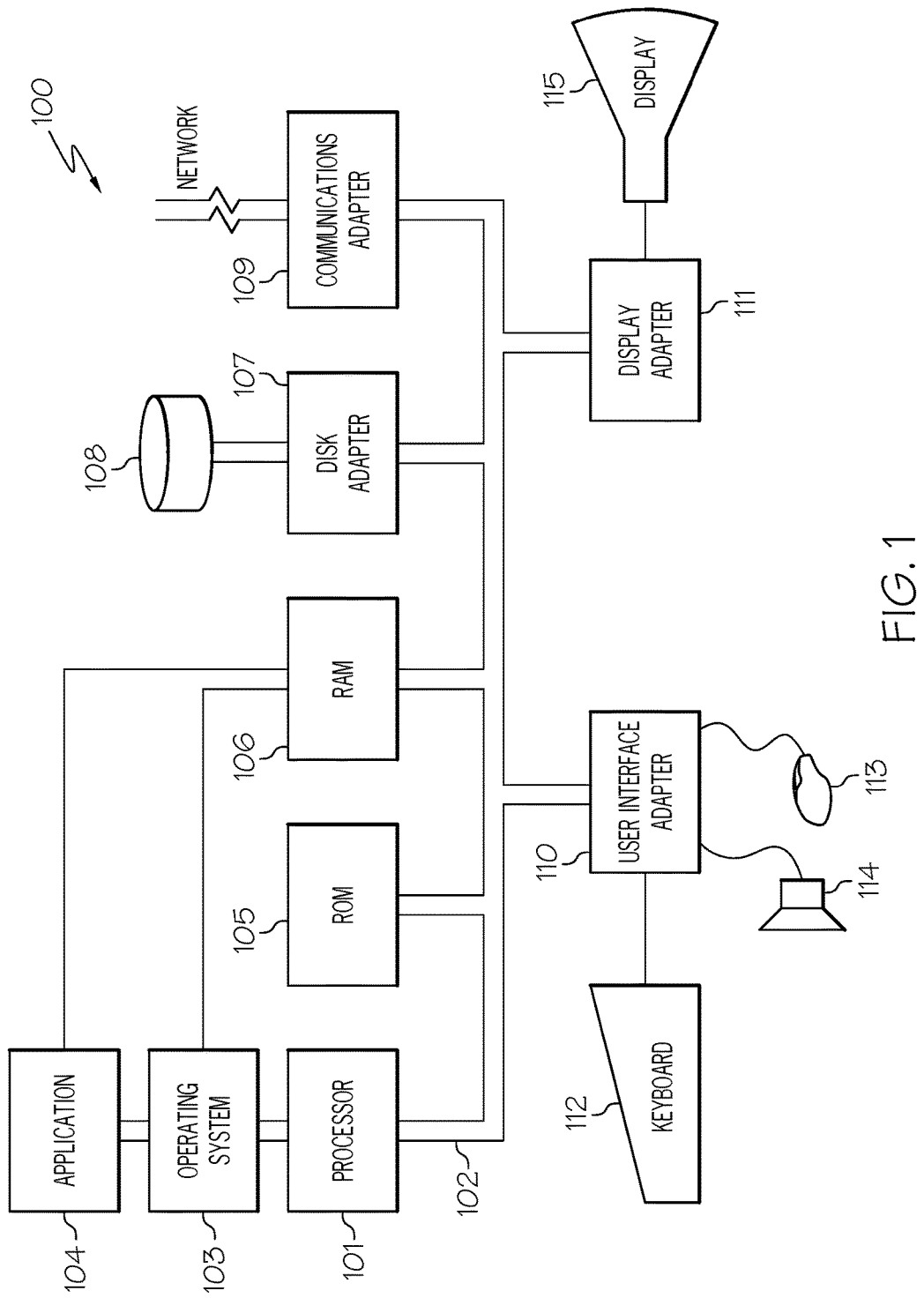
FIG. 1 illustrates an embodiment of the present invention of a hardware configuration of an analytics processing system for analytically selecting which tests are to be executed in a continuous delivery process.

Referring now to the Figures in detail, FIG. 1 illustrates an embodiment of the present invention of a hardware configuration of an analytics processing system 100 for analytically selecting which tests are to be executed in a continuous delivery process. System 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for analytically selecting which tests are to be executed in a continuous delivery process involving changed code as discussed further below in association with FIGS. 2 and 3.

Referring again to FIG. 1, read-only memory ("ROM") 105 is coupled to system bus 102 and includes a basic input/output system ("BIOS") that controls certain basic functions of system 100. Random access memory ("RAM") 106 and disk adapter 107 are also coupled to system bus 102. It should be noted that software components including operating system 103 and application 104 may be loaded into RAM 106, which may be system's 100 main memory for execution. Disk adapter 107 may be an integrated drive electronics ("IDE") adapter that communicates with a disk unit 108, e.g., disk drive. It is noted that the program for analytically selecting which tests are to be executed in a continuous delivery process involving changed code, as discussed further below in association with FIGS. 2 and 3, may reside in disk unit 108 or in application 104.

System 100 may further include a communications adapter 109 coupled to bus 102. Communications adapter 109 interconnects bus 102 with an outside network thereby enabling system 100 to communicate with other such systems.

I/O devices may also be connected to system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to system 100 through keyboard 112 or mouse 113 and receiving output from system 100 via display 115 or speaker 114.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, continuous delivery is a software engineering approach in which teams produce software in short cycles, ensuring that the software can be reliably released at any time. It aims at building, testing and releasing software faster and more frequently. This approach helps reduce the cost, time and risk of delivering changes by allowing for more incremental updates to applications in production. Typically, the time required in a continuous delivery process is dominated by the quality assurance phase. The higher the quality of the software product to be deployed, the more time in building and testing the software product is typically required. That is, if a higher quality software product is desired to be deployed, then one many need to run more tests in the process thereby lengthening the total time in delivering the software product. If, on the other hand, a shorter deployment time is required, then one may need to reduce the number of tests of the software product. Due to the pressure in delivering the software product as quickly as possible to the market, there is a tendency to have a shorter cycle time at the expense of the number of tests of the software product. As a result, it is not always feasible to carry out the full set of tests on the software product. However, there is not currently a means for determining the smallest number of tests to run on the software product that is needed to achieve the required quality in the fast continuous delivery process.

Figure 2:
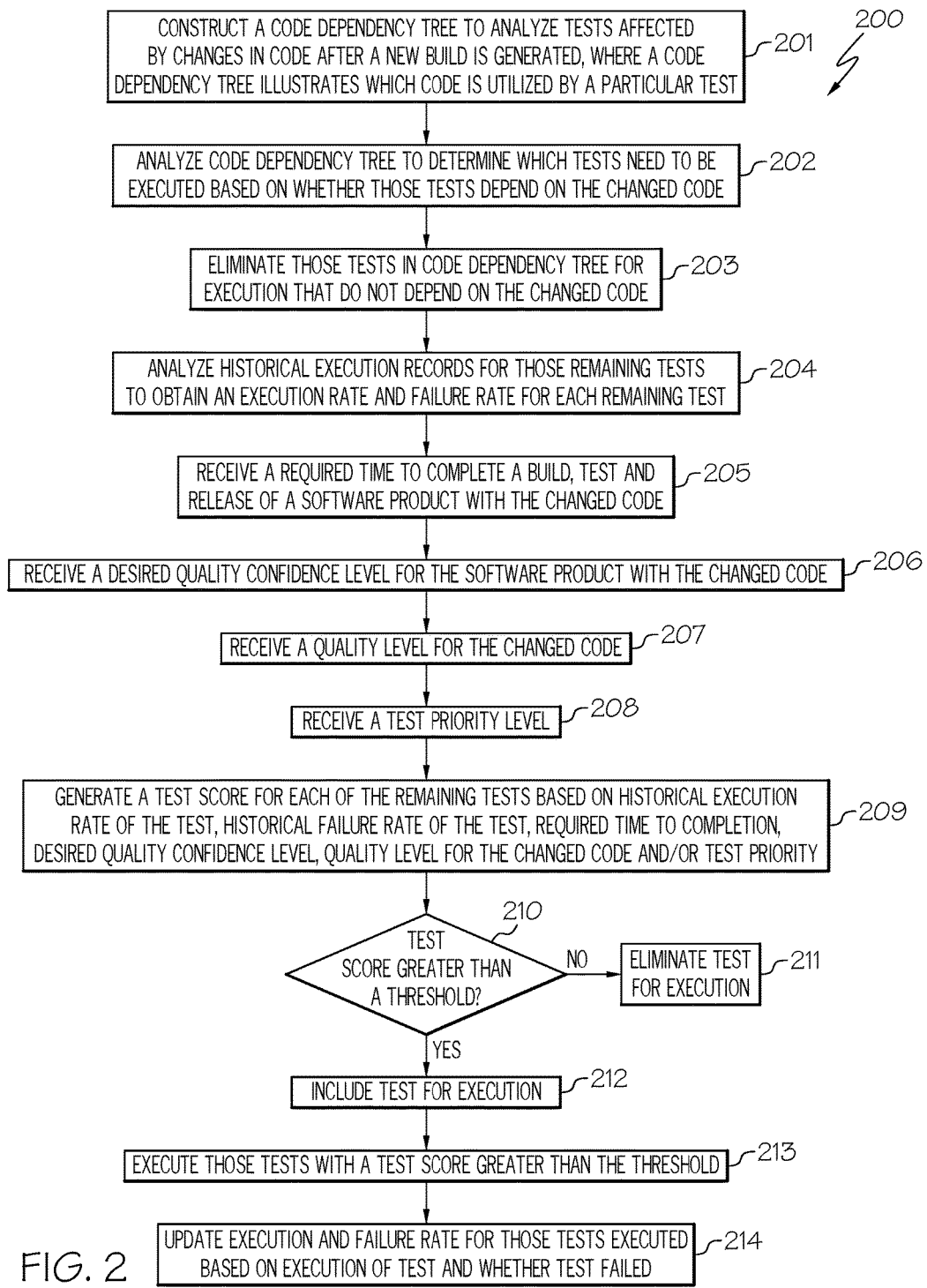
FIG. 2 is a flowchart of a method for analytically selecting which tests are to be executed in a continuous delivery process in accordance with an embodiment of the present invention.
Figure 3:
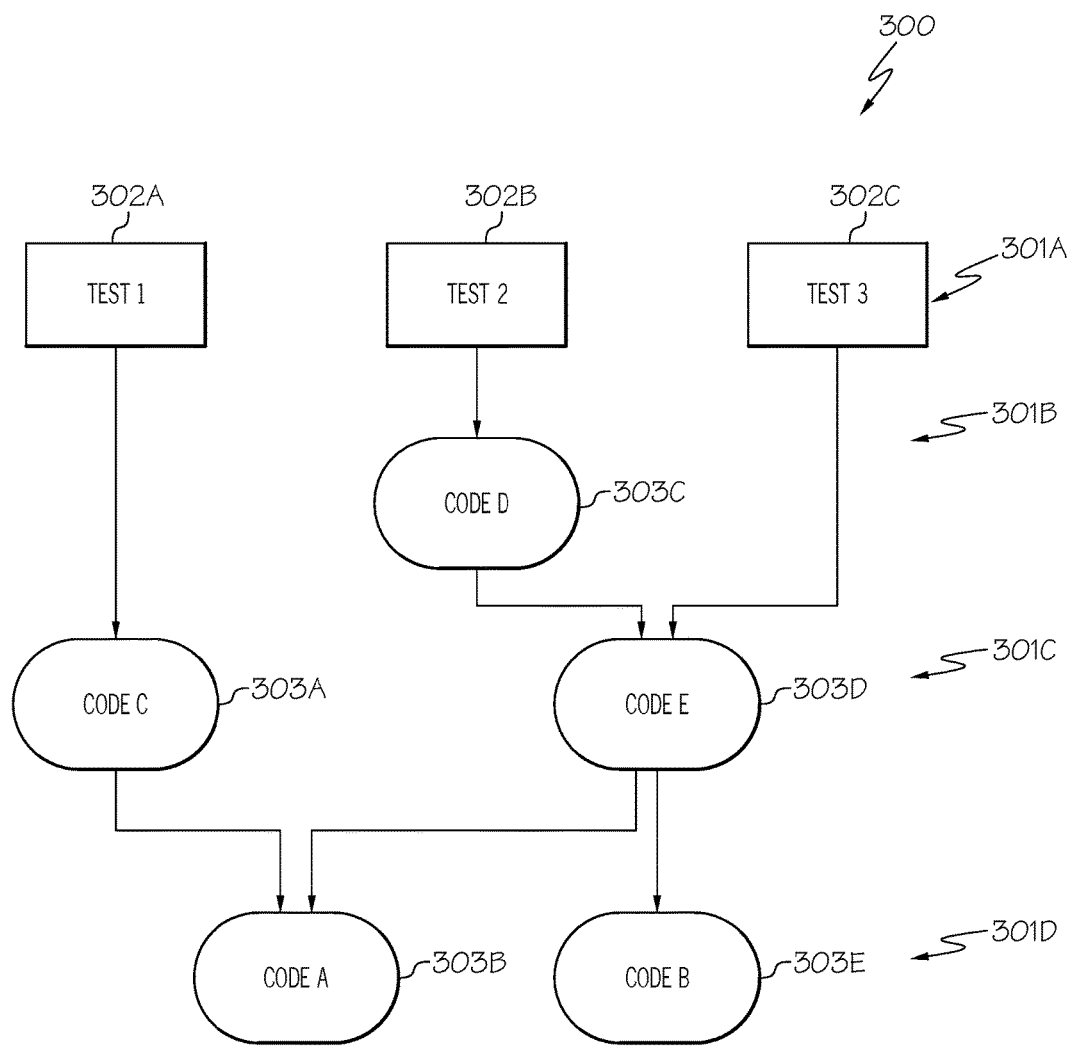
FIG. 3 illustrates a code dependency tree in accordance with an embodiment of the present invention.

The principles of the present invention provide a means for determining the smallest number of tests to run on the software product to achieve the required quality in the continuous delivery process by analytically assessing various sources of information (e.g., execution rate of test, failure rate of test, required time to complete build, test and release of software product, desired quality confidence level for the software product with the changed code, quality level for the changed code, priority level of the test) as discussed below in connection with FIGS. 2 and 3. FIG. 2 is a flowchart of a method for analytically selecting which tests are to be executed in a continuous delivery process. FIG. 3 illustrates a code dependency tree.

As stated above, FIG. 2 is a flowchart of a method 200 for analytically selecting which tests are to be executed in a continuous delivery process in accordance with an embodiment of the present invention.

Referring to FIG. 2, in conjunction with FIG. 1, in step 201, system 100 constructs a code dependency tree to analyze tests affected by changes in code after a new build is generated. A "code dependency tree," as used herein, refers to a hierarchical tree that illustrates which code is utilized by a particular test as illustrated in FIG. 3.

FIG. 3 illustrates a code dependency tree 300 in accordance with an embodiment of the present invention. As illustrated in FIG. 3, code dependency tree 300 includes various hierarchical levels 301A-301D of tests 302A-302C and code segments 303A-303E. Hierarchical levels 301A-301D may collectively or individually be referred to as levels 301 or level 301, respectively. While FIG. 3 illustrates four hierarchical levels 301, code dependency tree 300 may include any number of levels 301 based on the code segments (code segments 303A-303E) utilized by particular tests (tests 302A-302C) and the dependency of the code segments amongst each other. In one embodiment, code dependency tree 300 is constructed based on a prior generated build, where information, such as which code segments were utilized by which tests as well as the dependency of the code segments amongst each other are obtained.

Referring to FIG. 3, the "root" or highest level 301A lists the various tests 302A-302C (identified as "Test 1," "Test 2," and "Test 3," respectively in FIG. 3) to be potentially executed to test the software product during the continuous delivery process. The other hierarchical levels 301B-301D illustrate the code segments (code C 303A, code A 303B, code D 303C, code E 303D, code B 303E) upon which the tests 302A-302C depend upon as well as the dependency amongst the code segments. For example, FIG. 3 illustrates that Test 1 302A depends on code C 303A which is dependent upon code A 303B. In another example, FIG. 3 illustrates that Test 2 302B depends on code D 303C which depends on code E 303D which depends on both code A 303B and code B 303E. In a further example, FIG. 3 illustrates that Test 3 302C depends on code E 303D which depends on both code A 303B and code B 303E. Tests 302A-302C may collectively or individually be referred to as tests 302 or test 302, respectively. Furthermore, code segments 303A-303E may collectively or individually be referred to as code segments 303 or code segment 303, respectively. While FIG. 3 illustrates five code segments 303 and three tests 302, code dependency tree 300 may include any number of code segments 303 and tests 302.

Returning now to FIG. 2A, in conjunction with FIGS. 1 and 3, in step 202, system 100 analyzes code dependency tree 300 to determine which tests 302 need to be executed based on whether those tests 302 depend on the changed code (referring to the code that was changed in the continuous delivery process). For example, referring to FIG. 3, if code A 303B changed, then all of the tests, Test 1 302A, Test 2 302B and Test 3 302C need to be executed since they all depend on code A 303B indirectly. For instance, Test 1 302A depends on code C 303A, which depends on code A 303B. Test 302B depends on code D 303C, which indirectly depends on code A 303B. Test 303C depends on code E 303D, which depends on code A 303B.

In another example, referring to FIG. 3, if code E 303D changes, then only Test 2 302B and Test 3 302C need to be executed since only those tests 302 depend directly or indirectly on code E 303D. Test 1 302A, however, does not depend on code E 303D. As a result, Test 1 302A may be eliminated for execution thereby reducing the number of tests 302 that need to be executed to test the software product with the code changed in the continuous delivery process.

In step 203, system 100 eliminates those tests 302 in code dependency tree 300 for execution that do not depend on the changed code. For example, as shown in FIG. 3, if code D 303C changes, then Test 1 302A and Test 3 302C are eliminated for execution since these tests do not depend on code D 303C.

In step 204, system 100 analyzes the historical execution records for those tests 302 in code dependency tree 300 that have not been eliminated for execution in step 203 (such tests 302 are referred to herein as the "remaining tests" for execution) to obtain an execution rate and a failure rate for each test 302 that has not been eliminated for execution in step 203. An "execution rate," as used herein, refers to how often a test 302 is being executed over a duration of time. Such a factor is a direct indicator of how "hot" the code area upon which test 302 depends. The higher a test's 302 execution rate, the greater the likelihood that the code 303 upon which test 302 depends is changing. On the other hand, if a test 302 is rarely executed or if it has never been executed, then the code path it depends upon remains essentially unchanged and should not be of much concern.

The "failure rate," as used herein, refers to how often a test fails. This is a direct indictor of whether the code area 303 upon which test 302 depends upon, is a "fragile area." The higher the failure rate, the greater the need to have test 302 executed. On the other hand, if a test's 302 failure rate is low or non-existent, then such a test 302 may be excluded from execution based on the amount of risk to be tolerated.

In one embodiment, the historical execution records for tests 302 containing the execution and failure rates for each test 302 are stored in a storage unit (e.g., memory 105, disk unit 108). In another embodiment, such historical execution records are stored in servers/databases or another storage device (not shown in Figures), that may be accessible by system 100, such as via a network (e.g., wide area network, local area network) (not shown in Figures). These historical records may then be accessed by system 100 to determine the execution rate and the failure rate for each test 302.

By using the execution rate and failure rate for those tests 302 from code dependency tree 300 not eliminated for execution, a good indication may be made as to whether such a test 302 should be executed. If a test 302 has both a high execution rate and a high failure rate, then such a test 302 should be executed since the code 303 it depends upon not only changes a lot but is experiencing a lot of problems. Conversely, if a test 302 has a low execution rate and a low failure rate, then such a test 302 could be excluded from execution most of the time.

While these two factors (execution rate and failure rate) are helpful in selecting the appropriate tests 302 to be executed in a continuous delivery process, additional factors may be used as discussed below in conjunction with steps 205-208. One or more of these factors may be used in conjunction with the execution rate and/or the failure rate to select the appropriate tests 302 to be executed in a continuous delivery process as discussed below.

In step 205, system 100 receives a required time to complete a build, test and release of a software product with the changed code. In one embodiment, the required time to complete the build, test and release of the software product with the changed code is provided to system 100 by a user inputting the factor to system 100. The shorter the required time to completion, such as those projects/software products that demand a very short continuous delivery process completion time in order to achieve a fast delivery of the software product to the market, the greater the willingness to accept the sacrifice in short-term quality.

In step 206, system 100 receives a desired quality confidence level for the software product with the changed code. The "desired quality confidence level" for the software product with the changed code, as used herein, refers to the quality level of the software product with the changed code desired by the user. For example, a project/software product may have a high desired quality confidence level in situations where the software product needs to have a high quality assurance and cannot tolerate too many problems. In such a case, the user would prefer a somewhat longer completion time while utilizing a complete set of tests 302. In one embodiment, the desired quality confidence level is provided to system 100 by a user inputting the factor to system 100.

In step 207, system 100 receives a quality level of the changed code 303. In one embodiment, the "quality level of the changed code 303," refers to the level of problems experienced by the changed code 303. The greater the number of problems experienced by the changed code 303, the lower the quality level. Conversely, the fewer the number of problems experienced by the changed code 303, the greater the quality level of the changed code 303. In one embodiment, such a factor may be based on the historical records concerning problems experienced by code segments 303. In one embodiment, such historical records are stored in a storage unit (e.g., memory 105, disk unit 108). In another embodiment, such historical records are stored in servers/databases or another storage device (not shown in Figures), that may be accessible by system 100, such as via a network (e.g., wide area network, local area network) (not shown in Figures). These historical records may then be accessed by system 100 to determine the quality level of the changed code 303.

In step 208, system 100 receives a priority level for each of the remaining tests 302 in code dependency tree 300 that have not been eliminated for execution. A "priority level," as used herein, refers to the level of importance of the tests 302. For example, if a test 302 is to be used in testing software that is critical to a business and cannot tolerate any problems, then such a test 302 would be assigned a high priority. Tests 302 with a high priority should be less likely to be excluded from execution in comparison to a test 302 with a low priority. In one embodiment, the priority level of a test 302 is provided to system 100 by a user inputting the factor to system 100.

In step 209, system 100 generates a score (referred to herein as the "test score") for each of the remaining tests 302 from code dependency tree 300 that were not eliminated for execution based on the historical execution rate of test 302 (R), the historical failure rate of test 302 (F), the required time to complete the build, test and release of the software product with the changed code (D), the desired quality confidence level for the software product with the changed code (Q), the quality level for the changed code (A) and/or the test priority level (P). The test score of the present invention may be derived based on one or more of the factors discussed above. An example of an equation for calculating the test score using all of the factors discussed above is shown below:

$$\text{Test Score} = P*R*(F)^2*(D*Q/A)$$

where P corresponds to the priority level, R corresponds to the execution rate, F corresponds to the failure rate, D corresponds to the required time to complete the build, test and release of the software product with the changed code, Q corresponds to the desired quality confidence level for the software product with the changed code, and A corresponds to the quality level for the changed code.

Tests 302 that have a score (test score) that exceed a threshold are included for execution, whereas, those tests 302 with a score that do not exceed the threshold are excluded from execution. In this manner, the smallest number of tests 302 is selected to test the software product that is needed to achieve the required quality in the continuous delivery process.

In step 210, a determination is made by system 100 as to whether the test score (calculated in step 209) is greater than a threshold. In one embodiment, such a threshold is user-selected.

If the test score is not greater than the threshold, then, in step 211, system 100 eliminates the corresponding test 302 (test 302 with a test score not greater than the threshold) for execution.

If, however, the test score is greater than the threshold, then, in step 212, system 100 includes the corresponding test 302 (test 302 with a test score greater than the threshold) for execution.

In step 213, system 100 executes those tests 302 with a test score that is greater than the threshold.

In step 214, system 100 updates the execution rate and the failure rate for those tests 302 executed based on the execution of the test and whether the test failed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for analytically selecting which tests are to be executed in a continuous delivery process, the computer program product comprising a computer readable storage medium having program code embodied therewith, the program code comprising programming instructions for:

constructing a code dependency tree to analyze tests affected by changes in code, wherein said code dependency tree illustrates which code is utilized by a particular test;

analyzing said code dependency tree to determine which tests need to be executed based on whether those tests depend on a changed code;

eliminating tests in said code dependency tree for execution that do not depend on said changed code;

analyzing historical execution records for remaining tests from said code dependency tree that were not eliminated to obtain a historical execution rate and a historical failure rate for each of said remaining tests, wherein said historical execution rate indicates how often a test is being executed, wherein said historical failure rate indicates how often a test has failed;

generating a score for each of said remaining tests from said code dependency tree that were not eliminated based on said historical execution rate and said historical failure rate; and executing tests of said remaining tests from said code dependency tree that were not eliminated based on having a score exceeding a threshold.

2. The computer program product as recited in claim 1, wherein the program code further comprises the programming instructions for:

receiving a required time to complete a build, test and release of a software product with said changed code; and generating said score for each of said remaining tests from said code dependency tree that were not eliminated based on said historical execution rate, said historical failure rate and said required time to complete said build, test and release of said software product with said changed code.

3. The computer program product as recited in claim 1, wherein the program code further comprises the programming instructions for:

receiving a quality confidence level for a software product with said changed code; and generating said score for each of said remaining tests from said code dependency tree that were not eliminated based on said historical execution rate, said historical failure rate and said quality confidence level for said software product with said changed code.

4. The computer program product as recited in claim 1, wherein the program code further comprises the programming instructions for:

receiving a quality level for said changed code; and generating said score for each of said remaining tests from said code dependency tree that were not eliminated based on said historical execution rate, said historical failure rate and said quality level for said changed code.

5. The computer program product as recited in claim 1, wherein the program code further comprises the programming instructions for:

receiving a priority level for each of said remaining tests from said code dependency tree that were not eliminated; and generating said score for each of said remaining tests from said code dependency tree that were not eliminated based on said historical execution rate, said historical failure rate and said priority level.

6. The computer program product as recited in claim 1, wherein the program code further comprises the programming instructions for:

updating historical execution and failure rates for said executed tests based on execution of said tests and whether said tests faded.

7. The computer program product as recited in claim 1, wherein the program code further comprises the programming instructions for:
receiving a required time to complete a build, test and release of a software product with said changed code;
receiving a quality confidence level for said software product with said changed code;
receiving a quality level for said changed code;
receiving a priority level for each of said remaining tests from said code dependency tree that were not eliminated; and
generating said score for each of said remaining tests from said code dependency tree that were not eliminated using the following formula:

$$P*R*(F)2*(D*Q/A),$$

wherein said P corresponds to said priority level, wherein said R corresponds to said historical execution rate, wherein said F corresponds to said historical failure rate, wherein said D corresponds to said required time to complete said build, test and release of said software product with said changed code, wherein said Q corresponds to said quality confidence level for said software product with said changed code, and wherein said A corresponds to said quality level for said changed code.

8. A system, comprising:
a memory unit storing a computer program for analytically selecting which tests are to be executed in a continuous delivery process; and
a processor coupled to the memory unit, wherein the processor is configured to execute the program instructions of the computer program comprising:
constructing a code dependency tree to analyze tests affected by changes in code, wherein said code dependency tree illustrates which code is utilized by a particular test;
analyzing said code dependency tree to determine which tests need to be executed based on whether those tests depend on a changed code;
eliminating tests in said code dependency tree for execution that do not depend on said changed code;
analyzing historical execution records for remaining tests from said code dependency tree that were not eliminated to obtain a historical execution rate and a historical failure rate for each of said remaining tests, wherein said historical execution rate indicates how often a test is being executed, wherein said historical failure rate indicates how often a test has failed;
generating a score for each of said remaining tests from said code dependency tree that were not eliminated based on said historical execution rate and said historical failure rate; and
executing tests of said remaining tests from said code dependency tree that were not eliminated based on having a score exceeding a threshold.

9. The system as recited in claim 8, wherein the program instructions of the computer program further comprise:
receiving a required time to complete a build, test and release of a software product with said changed code; and
generating said score for each of said remaining tests from said code dependency tree that were not eliminated based on said historical execution rate, said historical failure rate and said required time to complete said build, test and release of said software product with said changed code.

10. The system as recited in claim 8, wherein the program instructions of the computer program further comprise:
receiving a quality confidence level for a software product with said changed code; and
generating said score for each of said remaining tests from said code dependency tree that were not eliminated based on said historical execution rate, said historical failure rate and said quality confidence level for said software product with said changed code.

11. The system as recited in claim 8, wherein the program instructions of the computer program further comprise:
receiving a quality level for said changed code; and
generating said score for each of said remaining tests from said code dependency tree that were not eliminated based on said historical execution rate, said historical failure rate and said quality level for said changed code.

12. The system as recited in claim 8, wherein the program instructions of the computer program further comprise:
receiving a priority level for each of said remaining tests from said code dependency tree that were not eliminated; and
generating said score for each of said remaining tests from said code dependency tree that were not eliminated based on said historical execution rate, said historical failure rate and said priority level.

13. The system as recited in claim 8, wherein the program instructions of the computer program further comprise:
updating historical execution and failure rates for said executed tests based on execution of said tests and whether said tests failed.

14. The system as recited in claim 8, wherein the program instructions of the computer program further comprise:
receiving a required time to complete a build, test and release of a software product with said changed code;
receiving a quality confidence level for said software product with said changed code;
receiving a quality level for said changed code;
receiving a priority level for each of said remaining tests from said code dependency tree that were not eliminated; and
generating said score for each of said remaining tests from said code dependency tree that were not eliminated using the following formula:

$$P*R*(F)2*(D*Q/A),$$

wherein said P corresponds to said priority level, wherein said R corresponds to said historical execution rate, wherein said F corresponds to said historical failure rate, wherein said Q corresponds to said required time to complete said build, test and release of said software product with said changed code, wherein said Q corresponds to said quality confidence level for said software product with said changed code, and wherein said A corresponds to said quality level for said changed code.

* * * * *